(12) United States Patent
Su et al.

(10) Patent No.: US 12,368,964 B2
(45) Date of Patent: Jul. 22, 2025

(54) BLIND LOCAL RESHAPING IN HDR IMAGING

(71) Applicant: Dolby Laboratories Licensing Corporation, San Francisco, CA (US)

(72) Inventors: Guan-Ming Su, Fremont, CA (US); Harshad Kadu, Santa Clara, CA (US); Tsung-Wei Huang, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 479 days.

(21) Appl. No.: 17/916,780

(22) PCT Filed: Apr. 1, 2021

(86) PCT No.: PCT/US2021/025464
§ 371 (c)(1),
(2) Date: Oct. 3, 2022

(87) PCT Pub. No.: WO2021/202933
PCT Pub. Date: Oct. 7, 2021

(65) Prior Publication Data
US 2023/0156343 A1 May 18, 2023

Related U.S. Application Data

(60) Provisional application No. 63/004,609, filed on Apr. 3, 2020.

(30) Foreign Application Priority Data

Apr. 3, 2020 (EP) .................................... 20167908

(51) Int. Cl.
*H04N 23/741* (2023.01)
*G06T 5/20* (2006.01)
(Continued)

(52) U.S. Cl.
CPC ............. *H04N 23/741* (2023.01); *G06T 5/20* (2013.01); *G06T 5/90* (2024.01); *G06V 10/60* (2022.01);
(Continued)

(58) Field of Classification Search
CPC ............... H04N 23/741; H04N 19/192; H04N 19/186; G06T 2207/20208; G06T 5/20; G06T 5/90; G06V 10/60
See application file for complete search history.

(56) References Cited

U.S. PATENT DOCUMENTS 9,020,257 B2  4/2015  El-Mahdy
10,032,262 B2  7/2018  Kheradmand
(Continued)

FOREIGN PATENT DOCUMENTS

CN  107005720 A  8/2017
CN  108885783 A  11/2018
(Continued)

OTHER PUBLICATIONS

Gommelet, David "Methods for Improving the Backward Compatible High Dynamic range Compression" Image Processing 2018.
(Continued)

*Primary Examiner* — John Villecco
*Assistant Examiner* — Alexander John Rodgers

(57) ABSTRACT

In an encoder, a high-dynamic range (HDR) image is encoded using a family of local forward reshaping functions selected according to an array of forward mapping indices (FMI) indicating which local forward reshaping function needs to be used for each pixel in the HDR image to generate a reshaped standard dynamic range (SDR) image. A decoder, given the reshaped SDR image, iteratively generates a reconstructed HDR image and estimated reshaped SDR images by adjusting a local FMI array and a local array of
(Continued)

backward mapping indices (BMI) until an error metric related to the difference between the local BMI and FMI arrays and the difference between the estimate SDR images and the reshaped SDR image satisfy a convergence criterion. Techniques for generating families of local forward reshaping functions and local backward reshaping functions based on a global forward reshaping function are also presented.

13 Claims, 7 Drawing Sheets

(51) Int. Cl.
  *G06T 5/90* (2024.01)
  *G06V 10/60* (2022.01)
  *H04N 19/186* (2014.01)
  *H04N 19/192* (2014.01)

(52) U.S. Cl.
  CPC ......... *H04N 19/186* (2014.11); *H04N 19/192* (2014.11); *G06T 2207/20208* (2013.01)

(56) References Cited

U.S. PATENT DOCUMENTS

| | | | |
|---|---|---|---|
| 10,080,026 B2 | 9/2018 | Su | |
| 10,244,244 B2 | 3/2019 | Piramanayagam | |
| 10,311,558 B2 | 6/2019 | Su | |
| 10,397,576 B2 | 8/2019 | Kadu | |
| 10,572,984 B2 | 2/2020 | Jolly | |
| 10,701,375 B2 | 6/2020 | Su | |
| 11,457,244 B2* | 9/2022 | Hannuksela | H04N 19/172 |
| 2008/0126812 A1* | 5/2008 | Ahmed | H04N 19/61 |
| | | | 713/189 |
| 2016/0021391 A1* | 1/2016 | Su | H04N 19/136 |
| | | | 375/240.12 |
| 2016/0309201 A1 | 10/2016 | Tsukagoshi | |
| 2017/0085880 A1 | 3/2017 | Minoo | |
| 2017/0308996 A1* | 10/2017 | Kadu | G06T 5/70 |
| 2018/0115777 A1 | 4/2018 | Piramanayagam | |
| 2018/0276841 A1* | 9/2018 | Krishnaswamy | G06V 10/25 |
| 2019/0073756 A1 | 3/2019 | Stessen | |
| 2019/0110054 A1 | 4/2019 | Su | |
| 2019/0172187 A1 | 6/2019 | Knibbeler | |
| 2019/0208173 A1 | 7/2019 | Kadu | |
| 2019/0349607 A1 | 11/2019 | Kadu | |
| 2020/0389648 A1* | 12/2020 | Shingala | H04N 19/176 |
| 2021/0368212 A1* | 11/2021 | Song | H04N 19/117 |
| 2022/0046245 A1* | 2/2022 | Kadu | H04N 19/117 |
| 2023/0007294 A1* | 1/2023 | Kadu | H04N 19/46 |
| 2023/0084705 A1* | 3/2023 | Su | H04N 19/46 |
| | | | 375/240.02 |
| 2023/0164366 A1* | 5/2023 | Su | H04N 19/98 |
| | | | 375/240.01 |
| 2023/0171436 A1* | 6/2023 | Song | H04N 19/186 |
| 2023/0370646 A1* | 11/2023 | Huang | G09G 5/10 |
| 2024/0037720 A1* | 2/2024 | Asayama | G06N 3/084 |
| 2024/0095893 A1* | 3/2024 | Su | G06V 10/60 |

FOREIGN PATENT DOCUMENTS

| | | |
|---|---|---|
| EP | 2252063 A1 | 11/2010 |
| EP | 3054417 A1 | 8/2016 |
| WO | 2017019818 A1 | 2/2017 |
| WO | 2017024042 A2 | 2/2017 |
| WO | 2017165494 A2 | 9/2017 |
| WO | 2018044803 A1 | 3/2018 |
| WO | 2019023202 A1 | 1/2019 |
| WO | 2020068666 A1 | 4/2020 |

OTHER PUBLICATIONS

Lu, T. et al "CE12: Mapping Functions (test CE12-1 and CE12-2)" JVET Meeting Jan. 15, 2019 , ISO/IECJTC1/SC29.

* cited by examiner

BLIND LOCAL RESHAPING IN HDR IMAGING

CROSS-REFERENCE TO RELATED APPLICATIONS

This application claims priority to U.S. Provisional Application No. 63/004,609 and European Patent Application No. 20167908.1, both filed on Apr. 3, 2020, each of which is incorporated by reference in its entirety.

TECHNOLOGY

The present disclosure relates generally to images. More particularly, an embodiment of the present invention relates to improving coding efficiency and image quality of high-dynamic range (HDR) images reconstructed from standard-dynamic range (SDR) images using local reshaping functions.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

In traditional reshaping techniques, a single, global, forward reshaping function may be applied to all pixels in an input HDR image to generate a reshaped SDR image to be compressed and transmitted to a decoder. Next, information related to the forward reshaping function (e.g., a parametric representation of the backward reshaping function) may be sent to a decoder as metadata together with the reshaped SDR image to assist a decoder to reconstruct the input HDR image. As appreciated by the inventors here, improved techniques for image reshaping to reduce coding artifacts in HDR coding and improve the quality of the corresponding reshaped SDR images are desired.

As used herein, the term "local reshaping" denotes that an encoder may use a family of reshaping functions and each pixel in an input image may be encoded using a different reshaping function, selected from the family of reshaping functions, according to local spatial information.

As used herein, the term "blind local reshaping" refers to a method where no information is sent to a decoder on how the individual forward reshaping functions were selected for each input HDR image pixel in the encoder, thus requiring the decoder to autonomously reconstruct that information from the encoded SDR data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
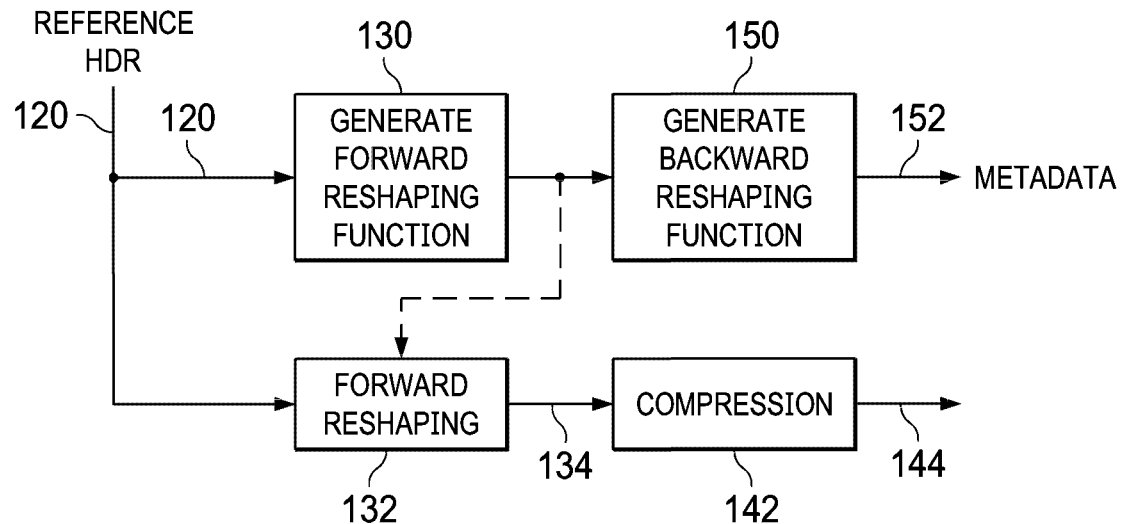
FIG. 1A depicts an example single-layer encoder for HDR data using a global reshaping function according to prior art.

Methods for blind local reshaping for coding HDR images and video content are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to blind local reshaping for coding of HDR images. In an embodiment, in an encoder, given an input HDR image, the encoder uses a family of forward reshaping functions and an array of forward mapping indices (FMI), where the FMI array indicates which forward reshaping function is to be used for each input HDR pixel, to reshape the input HDR image and generate a reshaped SDR image. In a decoder, given the received reshaped SDR image and a family of backward reshaping functions, the decoder applies an iterative technique to generate an array of backward mapping indices (BMI), where the BMI array indicates which backward reshaping function is to be used for each SDR pixel to generate a reconstructed HDR image which best approximates the input HDR image.

In an embodiment, in an apparatus comprising one or more processors, a decoder receives an input reshaped image (156) in a first dynamic range, it initializes (305) an array of backward mapping indices (BMI), wherein each element of the BMI array indicates an index of a local backward reshaping function in a set of two or more local backward reshaping functions, wherein a local backward reshaping function maps pixel values from the first dynamic range to pixel values in the second dynamic range, and performs one or more iterations to generate an output reconstructed image in a second dynamic range, wherein an iteration comprises:
  generating (310) a first reconstructed image in the second dynamic range by applying the set of local backward reshaping functions to the input reshaped image according to the BMI array;
  generating (315) a first array of forward mapping indices (FMI) based on the first reconstructed image and an FMI-generation function, wherein each element of the FMI array indicates an index of a local forward reshaping function in a set of two or more local forward reshaping functions, wherein a local forward reshaping function maps pixel values from the second dynamic range to pixel values in the first dynamic range;
  measuring a difference between the BMI array and the first FMI array according to a first error metric to generate a mapping-indices error;
  generating (325) an updated BMI array based on the mapping-indices error;
  generating (330) a second reconstructed image in the second dynamic range by applying the set of local backward reshaping functions to the input reshaped image according to the updated BMI array;
  generating (335) an updated FMI array based on the second reconstructed image and the FMI-generation function;
  generating (340) an estimate reshaped image in the first dynamic range by applying the set of local forward reshaping functions to the second reconstructed image according to the updated FMI array;
  measuring a difference between the estimate reshaped image and the input reshaped image according to a second error metric to generate a reshaped-images error; and
  testing if a combination of the reshaped-images error and the mapping-indices error satisfies a convergence criterion:
    if the converge criterion is satisfied, terminating the iteration and outputting the second reconstructed image as the output reconstructed image;
    else:
      replacing (360) elements of the BMI array based on elements of the updated BMI array and the reshaped-images error; and
      performing another iteration.

In a second embodiment, in an apparatus comprising one or more processors, a processor accesses a global forward reshaping function;
  generates property values for the global forward reshaping function, wherein the property values comprise one or more of: a non-flat region (x-range) of the function in the second dynamic range, a mid-point of the x-range, and flat regions for the for darks and highlights in the second dynamic range;
  generates a template forward reshaping function based on the global forward reshaping function, the property values, and an x-range scaling factor;
  generates a template backward reshaping function by computing an inverse function of the template forward reshaping function; and, for a local forward reshaping function related to a target luminance value in the second dynamic range, generates the local forward reshaping function by shifting the template forward reshaping function by an x-axis shift value, wherein the x-axis shift value is determined so that: for the target luminance value, corresponding mean reshaped output values using the local forward reshaping function and the template forward reshaping function are approximately equal.

Example HDR Coding System

Figure 1B:
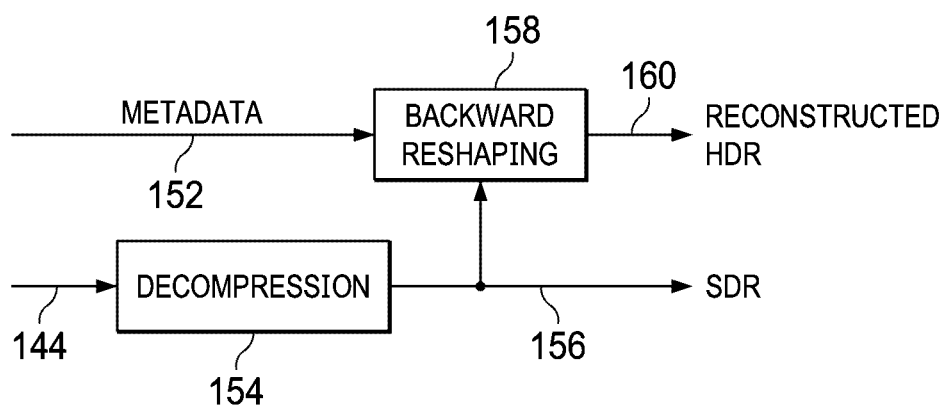
FIG. 1B depicts an example HDR decoder corresponding to the encoder of FIG. 1A, according to prior art.

As described in U.S. patent Ser. No. 10/032,262, "Block-based content-adaptive reshaping for high dynamic range images," by A. Kheradmand et al., to be referred to as the '262 patent, which is incorporated herein by reference in its entirety, FIG. 1A and FIG. 1B illustrate an example single-layer backward-compatible codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, given reference HDR content (120), corresponding SDR content (134) (also to be referred as base-layer (BL) or reshaped content) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward-reshaping metadata (152) is also encoded and transmitted in the video signal with the SDR content so that HDR display devices can reconstruct HDR content based on the SDR content and the backward reshaping metadata. Without loss of generality, in some embodiments, as in non-backward-compatible systems, SDR content may not be watchable on its own, but must be watched in combination with the backward reshaping function which will generate watchable SDR or HDR content. In other embodiments which support backward compatibility, legacy SDR decoders can still playback the received SDR content without employing the backward reshaping function.

As illustrated in FIG. 1A, given HDR image (120) and a target dynamic range, after generating, in step 130, a forward reshaping function (132); given the forward reshaping function, a forward reshaping mapping step (132) is applied to the HDR images (120) to generate reshaped SDR base layer (134). A compression block (142) (e.g., an encoder implemented according to any known video coding algorithms, like AVC, HEVC, AV1, and the like) compresses/encodes the SDR images (134) in a single layer (144) of a video signal. In addition, a backward reshaping function generator (150) may generate a backward reshaping function which may be transmitted to a decoder as metadata (152). In some embodiments, metadata (152) may represent the forward reshaping function (130), thus, it would be up to the decoder to generate the backward reshaping function (not shown).

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques, for example, and without limitation, as described in the '262 patent.

The backward reshaping metadata (152), as generated by the backward reshaping function generator (150) based on the SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the SDR images in the single layer (144) and the backward reshaping metadata (152) as a part of the overall image metadata are received as input on the decoder side of the codec framework. A decompression block (154) decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. In a backward-compatible system, the decoded SDR images (156) may be outputted in an output SDR video signal (e.g., over an HDMI interface, over a video link, etc.) to be rendered on an SDR display device.

Optionally, alternatively, or in addition, in the same or another embodiment, a backward reshaping block 158 extracts the backward (or forward) reshaping metadata (152) from the input video signal, constructs the backward reshaping functions based on the reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Blind Local Reshaping

Figure 2A:
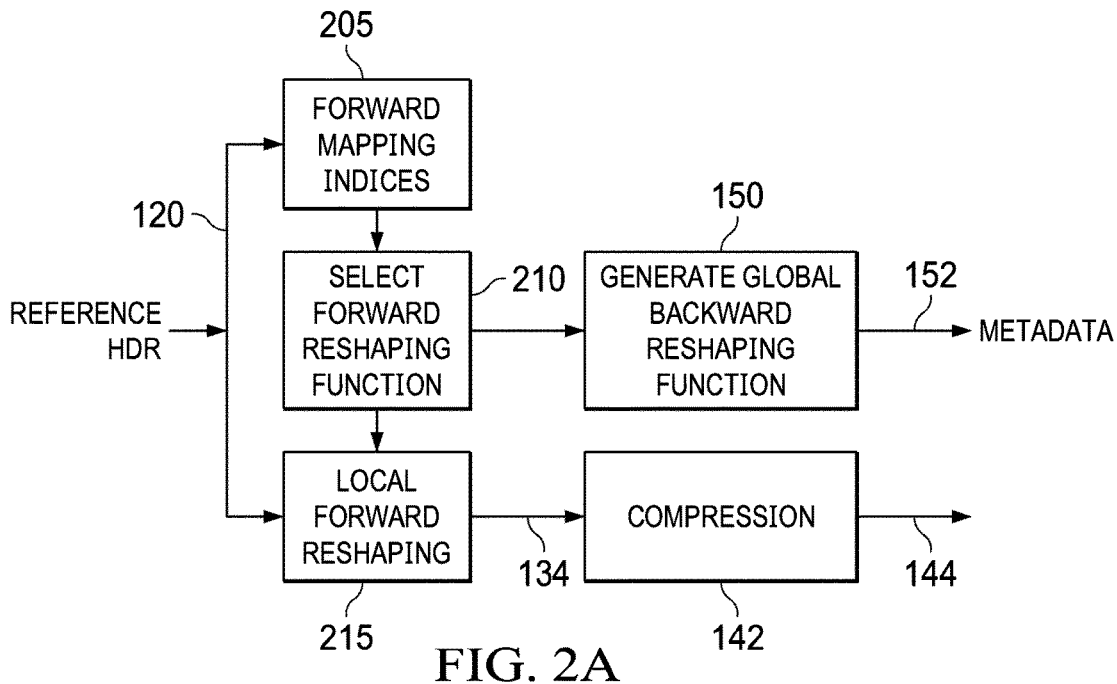
FIG. 2A depicts an example single-layer encoder for HDR data using local forward reshaping according to an embodiment of this invention.

Embodiments based on the systems depicted in FIG. 1A and FIG. 1B may be considered to be using "global reshaping," since the same forward reshaping function is used for remapping all pixels in a frame. FIG. 2A depicts an example of an embodiment of "local reshaping," where the encoder may apply multiple forward reshaping functions, where each of the functions is selected according to local image characteristics.

Figure 2B:
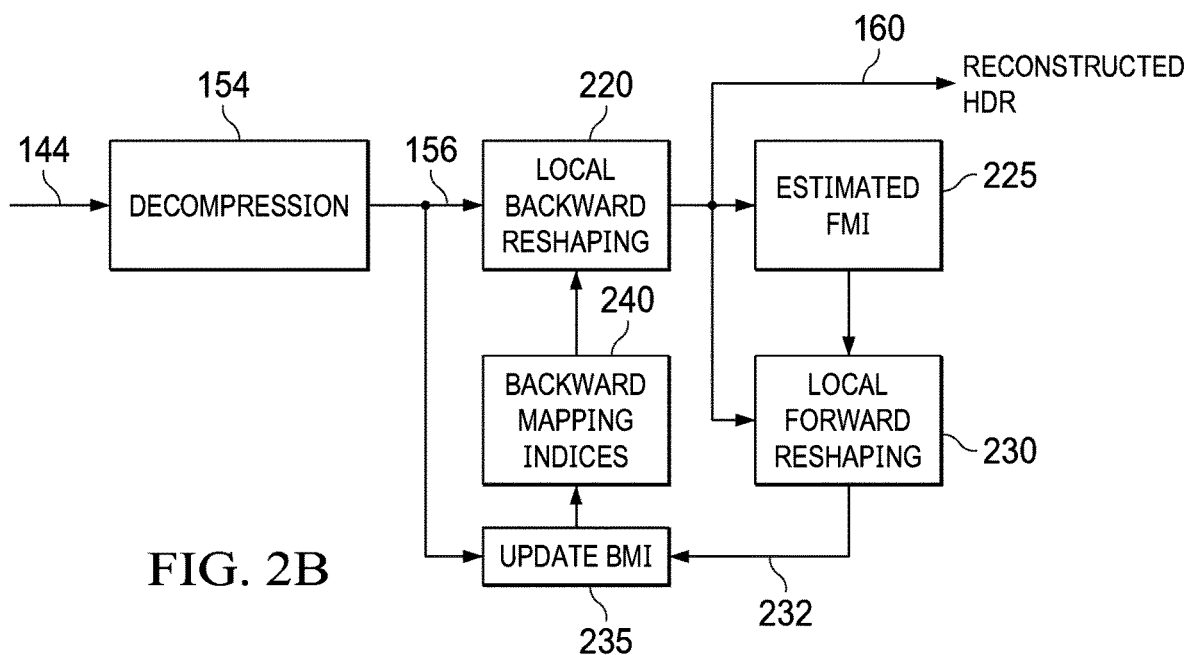
FIG. 2B depicts an example HDR decoder corresponding to the encoder of FIG. 2A, according to an embodiment of this invention.

Compared to FIG. 1A, as depicted in FIG. 2A, there is now a new table 205 of forward mapping indices (FMI) which indicate which one of the forward reshaping functions, among a finite set of such functions, should be used for each pixel in the reference HDR image (120). Given forward mapping table 205, forward reshaping (215) is performed as before, except that the reshaper engine (215) uses more than one forward reshaping function, as provided by unit (210), thus supporting local reshaping. To provide backwards compatibility with decoders which can't support locally-reshaped SDR images, in an embodiment, as in FIG. 1A, an optional unit 150 may also generate a global backward reshaping function or other metadata related to a global forward reshaping function, which can be transmitted together with the coded reshaped SDR image (144) as metadata (152). Note that the FMI array (205) does not need to be transmitted to the decoder. As will be explained later, in an example embodiment, a decoder (e.g., as depicted in FIG. 2B) may apply local inverse or backward reshaping to generate a reconstructed version (160) of the input HDR image using an iterative decoding process. This type of reshaping, allowing a decoder to perform local backward reshaping without any metadata from the encoder, may be referred to as "blind" reshaping.

Notation

Given an input reference HDR (120) sequence, let its bit-depth be denoted as $B^v$. Let the bit-depth of the corresponding reshaped SDR sequence (134) be denoted as $B^s$. Let $v_{t,i}$ denote the i-th pixel of the t-th frame in the input reference HDR signal. In an embodiment, one can collect all P pixels in the t-th frame together as an array denoted as $V_t$.

Let $s_{t,i}$ denote the i-th pixel in the t-th frame for a reference SDR signal. One can collect all P pixels in the t-th frame together as the vector $S_t$. In an embodiment, without loss of generality, to facilitate our discussion, the pixel values ($v_{t,i}$ and $s_{t,i}$) are not normalized (e.g. in [0, 1]) and are assumed to be their original bit depth range in this document (e.g., in [0, $2^{B^v}-1$] for each color plane). While methods presented herein may be discussed for a single color plane (say, luma Y), they are applicable to all available color planes in an input signal, regardless of their color space (e.g., RGB, YCbCr, and the like).

Denote the family of forward reshaping functions as $\{F_{<l>}(\ )|l=0,\ldots,L-1\}$, and denote the family of backward reshaping functions as $\{B_{<l>}(\ )|l=0,\ldots,L-1\}$, where L denotes the number of functions in each family. In an embodiment, these two families are revertible, within reasonable approximations related to quantization errors due to bit-depth differences and non-uniform intervals, thus:

$$F_{<l>}(\ )=B_{<l>}^{-1}(\ )l=0,\ldots,L-1,$$

$$B_{<l>}(\ )=F_{<l>}^{-1}(\ )l=0,\ldots,L-1. \quad (1)$$

Denote as $$M_t=G(V_t) \quad (2)$$

the process of generating the forward-mapping indices (FMI) (205), where, elements in $M_t$ are denoted as $m_{t,i}$, where $m_{t,i}$ is between 0 and L−1 and indicates the forward reshaping function to be used for the i-th pixel.

As mentioned earlier, since $M_t$ is not communicated to a decoder, a decoder may use an iterative process to estimate the elements of $M_t$ and a corresponding table ($N_t$) (240) with estimated backward mapping indices $n_{t,i}$. For notation purposes, at the k-th iteration, denote the reshaping function selection index in the forward path as $m_{t,i}^{(k)}$ and in the backward path as $n_{t,i}^{(k)}$, where $m_{t,i}^{(k)}$ and $n_{t,i}^{(k)}$ have value between 0 and L−1. Note that both selections may not be identical owing to the precision of estimation and convergence criteria. Furthermore, in a decoder, denote the selected forward reshaping function for the i-th pixel is $F_{m_{t,i}}(\ )$ and the selected backward reshaping function as $B_{n_{t,i}}(\ )$.

Local Forward Reshaping

As depicted in FIG. 2A, in an encoder, given $M_t$, in block 215, the reshaped SDR signal (134) is generated as $$\hat{s}_{t,i}=F_{m_{t,i}}(v_t,i). \quad (3)$$

As an example, in an embodiment, without limitation, the mapping function G( ) in equation (2) to generate $M_t$ may be expressed as $$G(\ )=G_2(G_1(\ )). \quad (4)$$

For example, the first operator, $G_1(\ )$, may be the Gaussian blur operator, which when applied to the input HDR image it generates blurred pixel values $$z(m,n) = \frac{1}{(2W+1)^2} \sum_{k=-W}^{W} \sum_{l=-W}^{W} g_1(k,l) v_t(m-k, n-k), \quad (5)$$

with weights defined as:

$$g_q(x,y) = \frac{1}{2\pi\sigma} e^{-\frac{x^2+y^2}{2\sigma^2}}, \quad (6)$$

where x and y denote the distance of the weighted pixel from the center of the filter, 2 W+1 denotes the width and height of the filter (e.g., W=12), and σ denotes the standard deviation of the blur (e.g., σ=50 for 1080p content).

As an example, in an embodiment, the second operator $G_2(\ )$ is a uniform quantizer, allocating one of the 0 to L−1 values to the output of the blur filter.

$$G_2(x) = \text{clip3}\left(\left\lfloor \frac{x}{U} \right\rfloor, 0, L-1\right), \quad (7)$$

where U denotes the quantization interval, and z=clip3(x, a, b) denotes a clipping function where $$z = \begin{cases} a; \text{if } x \leq a \\ b; \text{if } x \geq b \\ x; \text{if } a < x < b \end{cases}.$$

For L uniform intervals, with $2^{B^v}$ HDR codewords, $$U = \frac{2^{B^v}}{L}. \quad (8)$$

In some embodiments, the uniform quantizer may be replaced by a non-uniform quantizer or some other mapping function. In some embodiments, equation (4) is not applied to any letterbox area that may be surrounding the active area of a frame. Instead, when a letterbox area is detected, a single constant value (e.g., $m_{t,i}=c$, corresponding to the c-th forward reshaping function) may be applied to all the pixels in the letterbox area. In an embodiment, instead of using a blur filter one may use a low pass filter.

Local Backward Reshaping

The goal of local backward reshaping is to generate a reconstructed HDR image (160) which approximates, as close as possible, the original reference HDR image (120). In the reconstructing process, e.g., as depicted in FIG. 2B, one needs to estimate the forward function selection (225) and the backward function selection (240), each one associated with corresponding indices $m_{t,i}^{(k)}$ and $n_{t,i}^{(k)}$, where k denotes the k-th iteration in an iterative estimation process.

One of the convergence conditions is that both function selections need to be approximately equal, i.e. $m_{t,i}^{(k)} \approx n_{t,i}^{(k)}$; however, satisfying this convergence condition does not necessarily imply that the reconstructed HDR image will be close to original HDR image, since any trivial constant value, such as $m_{t,i}^{(k)}=n_{t,i}^{(k)}=$constant, for all values of i, can easily satisfy such a requirement but fail to predict the correct HDR signal. In an embodiment, given that the reshaped SDR signal (156) is known, another convergence condition is to check whether a reshaped SDR image (denoted as $SDR^{(k)}$) (232) generated using the reconstructed HDR image (160) is close enough to the original input SDR image (156). Thus, if these two convergence conditions are met, the estimated HDR image should be close to the original HDR image.

In an embodiment, the estimation process can be formulated as an optimization problem to minimize the (weighted) sum of a) the difference between the two reshaping function selection indices; and b) the difference between the input reshaped SDR and the estimated reshaped $SDR^{(k)}$. An iterative algorithm is proposed to reach this goal. In each iteration, the estimation difference from both convergence conditions is tested and if it fails the values of $m_{t,i}^{(k)}$ and $n_{t,i}^{(k)}$ are suitably adjusted. The steps of this iteration process are discussed with respect to both FIG. 2B and the more detailed example process flow in FIG. 3A.

Step 1 (305): Initialization
 1. k=0;
 2. Initialize (e.g., to a constant c=L/2) the array of backward mapping indices (BMI) $\{n_{t,i}^{(k)}\}$ (240) used to select the local backward reshaping functions ($B_{<l>}(\ )$).

Step 2 (310): Perform Local Backward Reshaping (220)

For each pixel $\hat{s}_{t,i}$ in the input reshaped SDR signal (156), find the corresponding reshaping function index $n_{t,i}^{(k)}$ and apply the corresponding backward reshaping function to generate the reconstructed HDR signal $\hat{v}_{t,i}^{(k)}$:

$$\hat{v}_{t,i}^{(k)} = B_{n_{t,i}^{(k)}}(\hat{s}_{t,i}). \quad (9)$$

The reconstructed HDR image at the k-th iteration may be expressed as vector $V_t^{(k)}$.

Step 3 (315): Generate an estimate array of forward mapping indices (FMI) (225) based on the reconstructed HDR image. The G( ) function may be the same as the one being used by the encoder.

$$M_t^{(k)} = G(V_t^{(k)}). \quad (10)$$

Step 4 (325): Update the BMI array (240) based on the differences between the current estimated FMI and BMI arrays.

1. First compute the difference between the existing estimate FMI and BMI arrays $$\Delta mn_{t,i}^{(k)} = m_{t,i}^{(k)} - n_{t,i}^{(k)}. \quad (11)$$

and compute the average difference for an entire frame $$\Delta mn_t^{(k)} = \frac{1}{P} \sum_{i=0}^{P-1} |\Delta mn_{t,i}^{(k)}|. \quad (12)$$

2. Next, update the BMI array based on the average difference $$n'_{t,i}^{(k)} = n_{t,i}^{(k)} + h(\alpha_1 \cdot \Delta mn_{t,i}^{(k)}). \quad (13)$$

In an embodiment, h( ) is a rounding and/or clipping function, and $\alpha_1$ controls the convergence speed (e.g., $\alpha_1=1$).

Step 5 (330): Given the updated array of BMI values (240), perform local backward reshaping again (220). For each input reshaped SDR pixel, find the updated backward reshaping function index $n'_{t,i}^{(k)}$ and apply local backward reshaping (220) to obtain an updated (second) version of the reconstructed HDR signal $$\hat{v}'_{t,i}^{(k)} = B_{n'_{t,i}^{(k)}}(\hat{s}_{t,i}). \quad (14)$$

The updated (second) version of the reconstructed image at the k iteration may be denoted as $V'_{t,i}^{(k)}$.

Step 6 (335): Estimate a Second FMI Array (225) Based on the Updated HDR Reconstructed Signal $$M'_t^{(k)} = G(V'_{t,i}^{(k)}). \quad (15)$$

Step 7 (340): Perform local forward reshaping (230) to obtain an estimate of the reshaped SDR image, $SDR^{(k)}$, based on the estimated reconstructed HDR signal.

For each pixel $\hat{v}'_{t,i}^{(k)}$, find the forward reshaping function index in $m'_{t,i}^{(k)}$ from $M'_t^{(k)}$ and apply (230) the corresponding forward reshaping function to generate an estimated version of the reshaped SDR signal (232).

$$\hat{s}'_{t,i}^{(k)} = F_{m'_{t,i}^{(k)}}(\hat{v}'_{t,i}^{(k)}). \quad (16)$$

Step 8 (345): Compute the Difference Between the Input SDR Reshaped Image and the Estimated SDR Reshaped Image $$\Delta \hat{s}_{t,i}^{(k)} = \hat{s}_{t,i} - \hat{s}_{t,i}'^{(k)}, \quad (17)$$

$$\Delta \hat{s}_t^{(k)} = \frac{1}{P}\sum_{i=0}^{P-1}|\Delta \hat{s}_{t,i}^{(k)}|.$$

Note that in Step 4 and in this step one may replace the L1 error with a mean square error metric or other error metrics known in the art, such as the signal to noise ratio (SNR) or peak SNR. Such metrics are more computationally-intensive but may improve convergence speed.

Step 9 (350): Determine Convergence and Update the BMI Array

1. Compute the Overall Error $$D_t^{(k)} = w_1 \cdot \Delta \hat{s}_t^{(k)} + w_2 \cdot \Delta mn_t^{(k)} \quad (18)$$

where $w_1+w_2=1$ are weighting factors to weight the two types of errors. For example, if both errors are deemed equally important $w_1=w_2=0.5$.

2. If the overall error ($D_t^{(k)}$) is smaller than a threshold $\Delta$ (e.g., for unnormalized 10-bit data, $\Delta=0.5$), then the decoder has converged. The current BMI array $\{n'_{t,i}{}^{(k)}\}$ is considered the final one, and in output step 355, the output of Step 5 (330) (equation (14)) is considered the final reconstructed HDR output.

3. If $D_t^{(k)} > D_t^{k-1}$ it implies one may not be able to find a better solution. The previous BMI array $\{n_{t,i}{}^{(k-1)}\}$ is considered the final one, and in output step 355 the previously generated signal $$\hat{v}_{t,i}'^{(k-1)} = B_{n_{t,i}'^{(k-1)}}(\hat{s}_{t,i})$$

is considered the final reconstructed HDR output.

4. Otherwise (step 360)($D_t^{(k)} > \Delta$ and $D_t^{(k)} < D_t^{(k-1)}$), update (235) the BMI array based on the reshaped SDR differences and return to Step 2 (310), that is:

$k=k+1$ $$n_{t,i}{}^{(k)} = n_{t,i}{}^{(k-1)} + h(\alpha_2 \cdot \Delta \hat{s}_{t,i}{}^{(k-1)}). \quad (19)$$

return to Step 2 (310), where $\alpha_2$ is another variable to manage convergence, (e.g., $\alpha_2=1$).

Compared to FIG. 2A, one may notice that in each iteration this process includes two separate updates of the FMI array: a) in Step 3 (315) and b) in Step 6 (335). The first time FMI array is updated, the BMI array is updated based on the error between the current BMI and FMI values (step 325). The second time the FMI array is updated, the decoder uses the second FMI array to generate a more accurate reshaped SDR estimate, before computing the reshaped SDR error in Step 8 (345). Experimental results have shown that such a process iterates much faster.

Figure 3A:
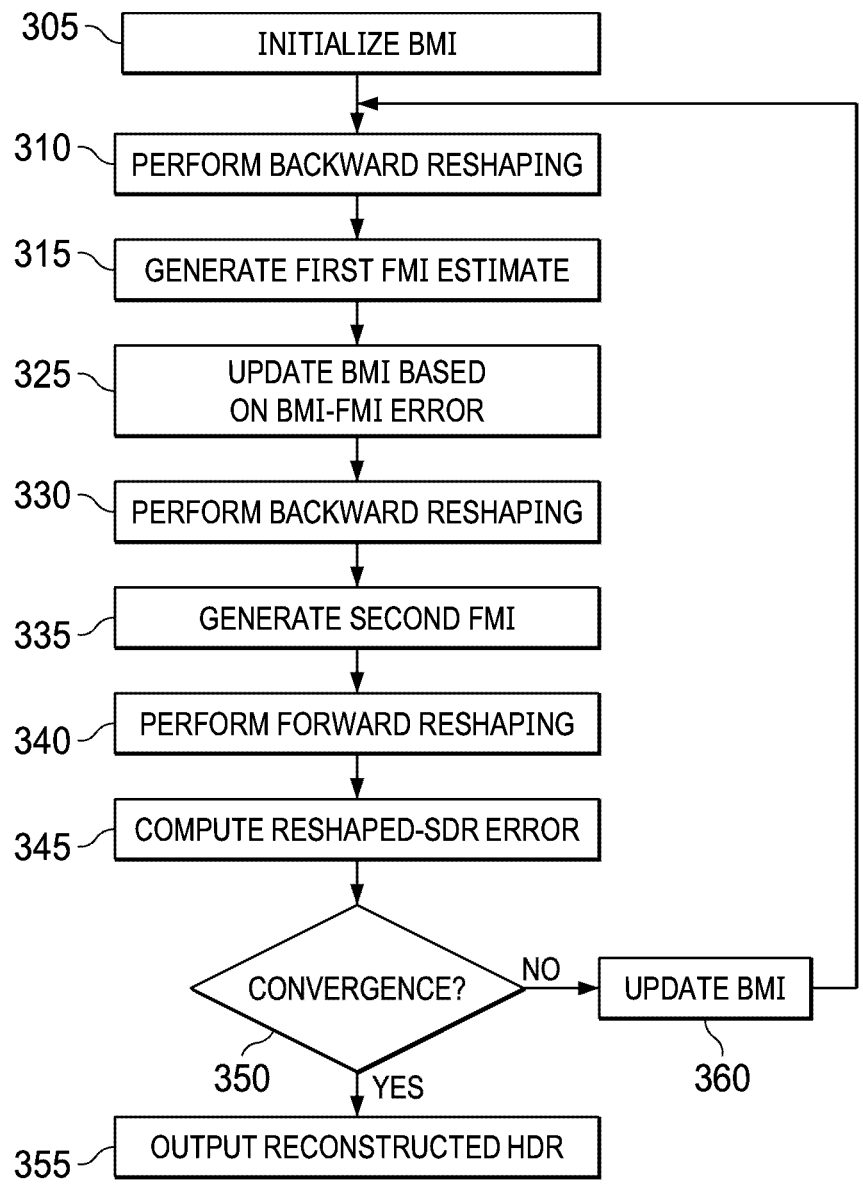
FIG. 3A depicts an example iterative process for blind local backward reshaping according to a first embodiment of this invention.
Figure 3B:
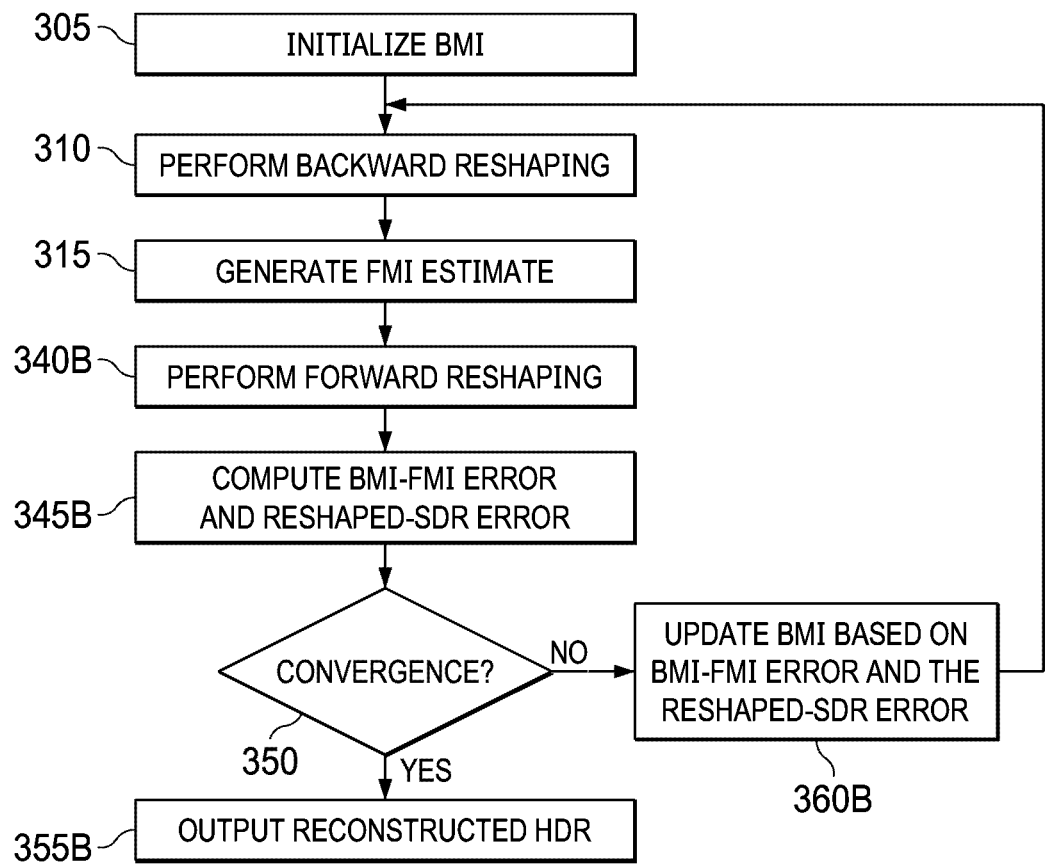
FIG. 3B depicts an example iterative process for bling local backward reshaping according to a second embodiment of this invention.

In another embodiment, this duplicate step can be eliminated to reduce complexity, but overall, convergence may be slower. This scheme is depicted in FIG. 3B, where Step 5 (330) and Step 6 (335) from FIG. 3A are now removed. This implies, that previous Step 8 (345), to compute the reshaped SDR difference, will now be replaced by step 345B which also computes the BMI-FMI error:

$$\Delta mn_{t,i}^{(k)} = m_{t,i}^{(k)} - n_{t,i}^{(k)}. \quad (20)$$

$$\Delta mn_t^{(k)} = \frac{1}{P}\sum_{i=0}^{P-1}|\Delta mn_{t,i}^{(k)}|.$$

$$\Delta \hat{s}_{t,i}^{(k)} = \hat{s}_{t,i} - \hat{s}_{t,i}^{(k)},$$

$$\Delta \hat{s}_t^{(k)} = \frac{1}{P}\sum_{i=0}^{P-1}|\Delta \hat{s}_{t,i}^{(k)}|,$$

where (340B), $SDR^{(k)}$ is given by:

$$\hat{s}_{t,i}^{(k)} = F_{m_{t,i}^{(k)}}(\hat{v}_{t,i}^{(k)}). \quad (21)$$

In addition, updating the BMI array based on the error between the current BMI and FMI difference (325) is being absorbed into step 360B, since there is no need to update the BMI array if there is convergence. Thus, in step 360B $k=k+1$ $$n'_{t,i}{}^{(k)} = n_{t,i}{}^{(k-1)} + h(\alpha_1 \cdot \Delta mn_{t,i}{}^{(k-1)}).$$

$$n_{t,i}{}^{(k)} = n'_{t,i}{}^{(k-1)} + h(\alpha_2 \cdot \Delta \hat{s}_{t,i}{}^{(k-1)}). \quad (22)$$

return to Step 2 (310), where the error metrics may be computed using equation (20).

Now, if there is convergence (e.g., step 355B), the current BMI array $\{n_{t,i}{}^{(k)}\}$ is considered the final one and the output of Step 2 (310) (equation (9)) is considered the final reconstructed HDR output (160).

Constructing Local Reshaping Functions

The methods described so far are applicable to any type of revertible reshaping functions. In this section some specific examples of local reshaping functions and their properties will be discussed.

Local Reshaping Functions Based on a Global Reshaping Function

Denote the global forward and backward reshaping function as F( ) and B( ), respectively. Ideally, within a quantization error, F( )=B$^{-1}$( ) In an embodiment, the selection of the local reshaping functions may depend on the properties of the luma pixels (e.g., their value, or a value, say mean, standard deviation, and the like, computed based on neighboring pixels).

In an embodiment, for the set of local reshaping functions the following properties may be desirable:

use local reshaping to locally increase the sharpness and contrast ratio of the reshaped SDR image. This may be achieved by increasing the slope of each local forward reshaping function while compressing the global forward reshaping function in the x-axis; i.e., by reducing the width (range) of the non-flat areas of the global reshaping function in the HDR x-axis while maintaining the same range in the SDR y-axis. Denote this x-axis-compression ratio as $\alpha$, where $0<\alpha<1$.

Maintain a constant global brightness. This may be achieved if, given an HDR codeword, each local reshaping function yields a reshaped SDR value close to the value provided by the global reshaping function.

Given the local forward reshaping functions, the local backward reshaping functions can be built by inverting the local forward reshaping functions. As discussed earlier, one needs to construct L forward local reshaping functions and L backward local reshaping functions.

For the first property mentioned above, if the x-axis compression ratio is fixed for all L forward/backward reshaping functions, one can build a template forward function, $F^T(\ )$, and a template backward reshaping function, $B^T(\ )$, to be used as the foundation functions. Next, one can shift the template forward reshaping function across the x-axis to generate the desired set of local forward reshaping functions. These steps are described next.

Step 1. Identify Properties of the Global Reshaping Function

Figure 4A:
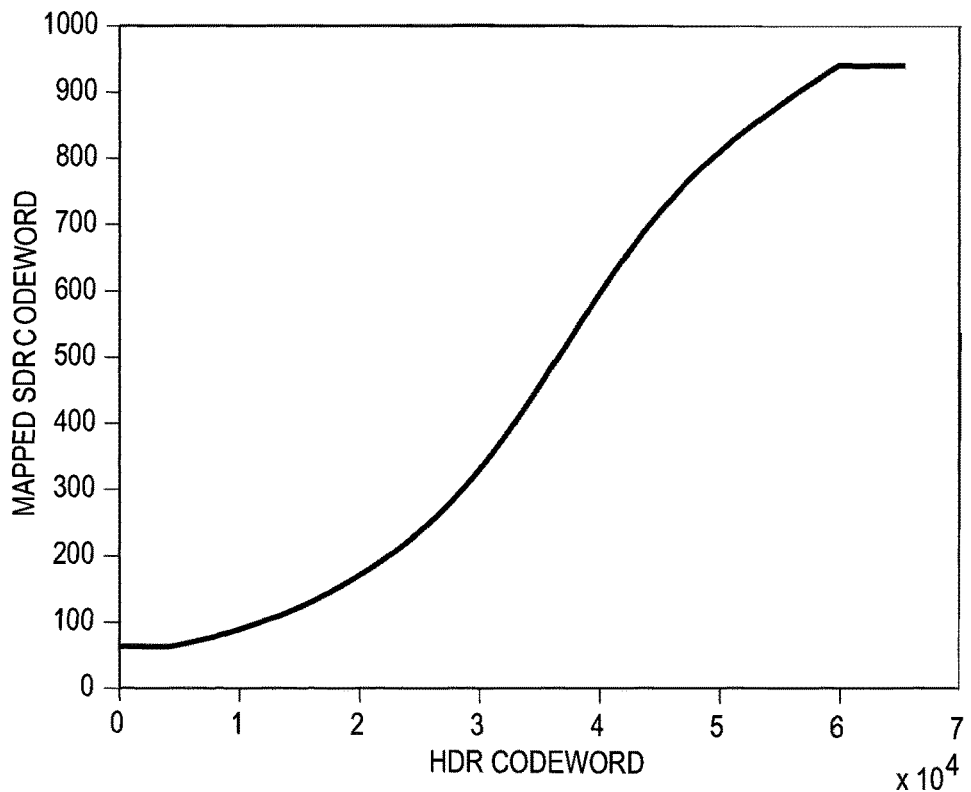
FIG. 4A depicts an example plot of a global forward reshaping function.

The first step is to identify the properties of the global forward reshaping function $F(\ )$, such as, its input and output range (e.g., its minimum and maximum input and output codewords), its mid value in the non-flat range, and the like. Without limitation, an example of a global forward reshaping function, mapping 16-bit HDR data (4,000 nits, PQ) to 10-bit SDR data (100 nits, gamma) is shown in FIG. 4A. As depicted in FIG. 4A, a typical global reshaping function has a sigmoid characteristic with two flat areas in the dark region and the highlight region due to limitations on what are considered valid input and output values. To build the template forward reshaping function, one may exclude those flat regions and only consider (scale) the regions with slope>0. As an example, to identify the beginning and end points of the non-flat region, one may apply the pseudo code in Table 1, where δ denotes a very small, larger than zero, threshold, related to the numerical accuracy of our computations (e.g., δ=0.0001 for floating point operations).

TABLE 1

Search for flat segments in the global reshaping function

```
// search for flat areas in the darks area
for( v = 1; v < 2^{B^V} ; v++){
    if( | F (v) − F (v − 1) | > δ ){
        v^L = v− 1;
        break;
    }
}
// search flat areas in the highlights area
for( v = 2^{B^V} − 2; v >= 0; v—){
    if( | F (v + 1) − F (v) | > δ ){
        v^H = v + 1;
        break;
    }
}
```

Then, one can compute the entire valid input HDR range as:

$$v^R = v^H - v^L. \quad (23)$$

The middle point of the valid input HDR range can be calculated as $$v^M = \text{round}\left(\frac{v^H + v^L}{2}\right). \quad (24)$$

Step 2. Generate the Template Forward Reshaping Function

Given an x-axis compression ratio a, the new scaled range in HDR signal is $$v^{T,R} = \lceil \alpha \cdot v^R \rceil. \quad (25)$$

Owing to the ceiling operator, the value of a may be updated as $$\alpha = \frac{v^{T,R}}{v^R}. \quad (26)$$

Then, the template forward reshaping function, $F^T(\ )$ may be constructed as depicted in Table 2.

TABLE 2

Example of generating a template function based on the global reshaping function

```
for(v = 0; v = v^{T,R}; v++)
    //find the corresponding point in original un-scaled
    global reshaping function
```

$$v^{T,g} = v^L + \frac{v}{\alpha}$$

```
    //find two nearest integer points
    v_L^{T,g} = ⌊v^{T,g}⌋
    v_H^{T,g} = ⌈v^{T,g}⌉
    //find weighting factor
    w_H^{T,g} = v^{T,g} − v_L^{T,g}
    w_L^{T,g} = 1 − w_H^{T,g}
    //interpolated from these two integer points
    F^T(v) = w_H^{T,g} · F(v_H^{T,g}) + w_L^{T,g} · F(v_L^{T,g})
    F^T(v) = clip3(F^T(v), 0, 2^{B^S} − 1)
end
//find the max and min value after the mapping
F_{max}^T = max{F^T( )}
F_{min}^T = min{F^T( )}
```

Figure 4B:
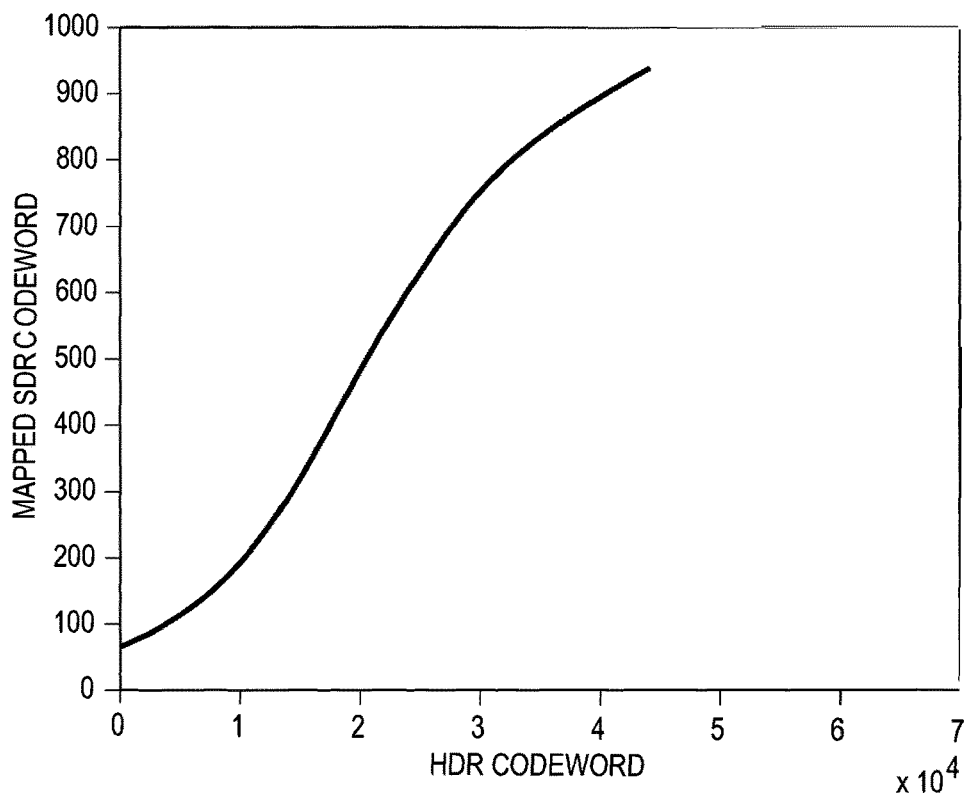
FIG. 4B depicts an example plot of a template forward reshaping function corresponding to the global forward reshaping function of FIG. 4A.

FIG. 4B depicts an example of a template forward reshaping function generated based on the global forward reshaping function of FIG. 4A using α=0.8.

Step 3. Generate the Template Backward Reshaping Function

Figure 4C:
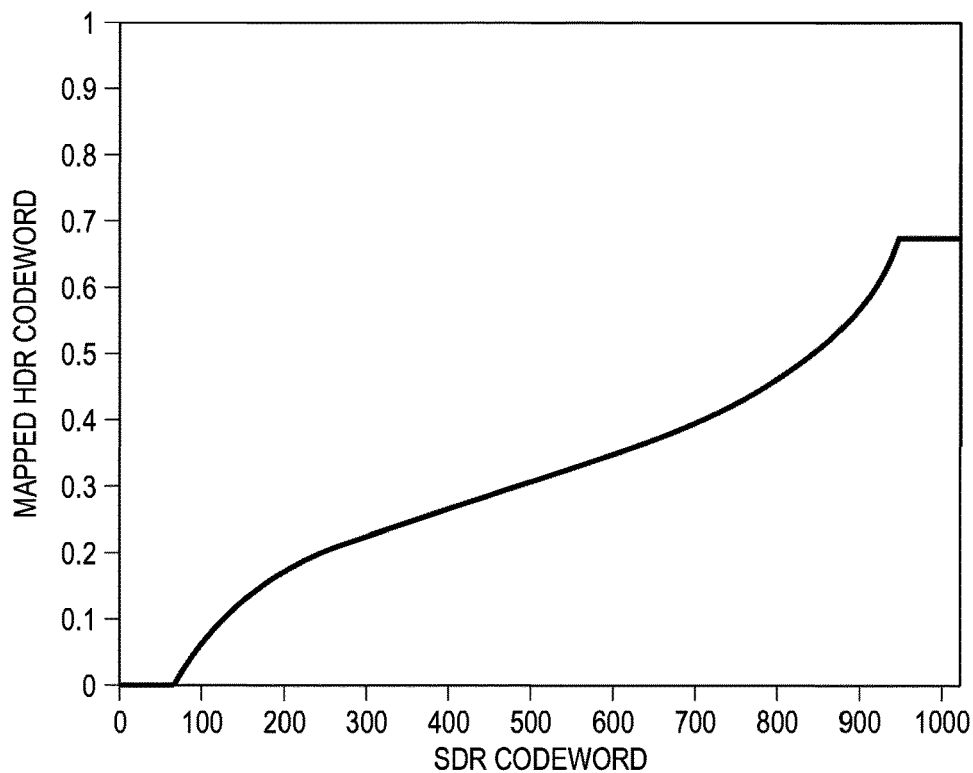
FIG. 4C depicts an example plot of a template backward reshaping function corresponding to the template forward reshaping function of FIG. 4B.

The template backward reshaping function, $B^T(\ )$, can be reconstructed by inverting the template forward reshaping function. An example process is described in Table 3. Given, the template forward reshaping function in FIG. 4B, FIG. 4C presents the corresponding template backward reshaping function.

TABLE 3

Example process to generate a template backwards reshaping function from the template forward reshaping function

```
s_L^T = F^T(0)
s_H^T = F^T(v^{T,R})
//construct the middle part
for(s = s_L^T; s <= s_H^T; s++)
    //find the HDR codewords which map to SDR codeword s
    Φ_s = {v|F^T(v) = s}
    //compute the average of those HDR codewords
```

$$B^T(s) = \frac{1}{\|\Phi_s\|} \sum_{v \in \Phi_s} v$$

```
end
//construct the dark part
for(s = 0; s < s_L^T; s++)
    B^T(s) = B^T(s_L^T)
end
//construct the highlight part
for(s = s_H^T + 1; s < 2^{B^S}; s++)
    B^T(s) = B^T(s_H^T)
end
```

Step 4: Generate the Family of Local Forward Reshape Functions

Given the template forward reshaping function and the template backward reshaping function, one can build the entire family of local reshaping functions as follows.

Build Shifted Version of Each Local Reshaping Function

Consider building L local forward reshaping functions $F_{<l>}(\ )$ and $B_{<l>}(\ )$. When $m_{t,i}=1$, then the i-th HDR pixel is reshaped using the l-th forward reshaping function. In an embodiment, first one may partition the input codeword range into L uniform intervals and find the center for each interval.

$$I^v = \frac{2^{B^v}}{L}, \quad (27)$$
$$C_l^v = \text{round}((0.5 + l)I^v).$$

Given the goal of maintaining global brightness, in an embodiment, one solution comprises to force having the same mapped value for both the original global reshaping function F $(C_l^v)$ and the scaled-shifted version of local reshaping function $F_{<l>}(C_l^v)$ at the center of interval, $C_l^v$. Note that a horizontal shift in a local forward reshaping function will cause a vertical shift in the corresponding local backward reshaping function. In other words, one can use this property to determine the "shift" for the l-th local reshaping function from the template function without recomputing the function. This is depicted in Table 4, where the main idea is that to generate the l-th local reshaping function based on the template function, the template forward reshaping function is shifted so that it intersects the global reshaping function at the l-th bin-center $C_l^v$. In other words, at the l-th bin-center, the l-th local reshaping function and the global reshaping function map to the same value. Thus, to generate the l-th local forward and backward reshaping functions:

TABLE 4

Example of generating a local reshaping function by shifting the template forward reshaping function to match its brightness

```
//initialize F<l>( ) for darks and highlights
for(v = 0; v < v^M; v++)
    F<l>(v) = F_min^T
end
for(v = v^M; v < 2^B^v; v++)
    F<l>(v) = F_max^T
end
//find the matching point set
Ω_l^v = {v|F(C_l^v) = F^T(v)}
//find the average matching point. This matching point indicates
F(φ_l^v) = F<l>(φ_l^v)
```

$$\phi_l^v = \text{round}\left(\frac{1}{\|\Omega_l^v\|} \sum_{v \in \Omega_l^v} v\right)$$

```
//find the starting point and ending point for the shifted version
a_l^v = C_l^v - φ_l^v
b_l^v = a_l^v + v^{T,R} - 1
//copy the mapped value if not out of range
If((a_l^v >= 0) && (b_l^v < 2^B^v))
    //set valid flag
    ω_l^v = 1
    //perform copy for forward local function
    for(v = a_l^v; v <= b_l^v; v++)
        F<l>(v) = F^T(v - a_l^v)
    end
```

TABLE 4-continued

Example of generating a local reshaping function by shifting the template forward reshaping function to match its brightness

```
    //perform copy for backward local function
    for(s = 0; s < 2^B^s; s++)
```

$$B_{<l>}(s) = B^T(s) + \frac{a_l^v}{2^{B^v}}$$

```
    end
else
    //set invalid flag if start or end points of shifter version are
    //out of legal codeword range
    ω_l^v = 0
end
```

For those local functions with an invalid flag (e.g., because their start or end points are outside of the valid range [0 $2^{B^v}$)), local functions may be generated by either interpolating from the nearest local reshaping functions or by copying their nearest local reshaping function. An example of this process, without limitation, is depicted in Table 5.

TABLE 5

Example of interpolating a local reshaping function from its neighbors when a valid function can't be found

```
for( l = 0; l < L; l++)
    // if current function is not valid
    if( ω_l^v == 0 )
        // find the nearest valid functions
        ĩ_L = max{ĩ | ω_ĩ^v = 1, ĩ < l} // dark part
        ĩ_H = min{ĩ | ω_ĩ^v = 1, ĩ > l} // highlight part
        If( (l - ĩ_L) < (ĩ_H - l) ) // dark part is closer , use dark part
            F<l> ( ) = F<ĩ_L> ( )
            B<l> ( ) = B<ĩ_L> ( )
        else   // highlight part is closer , use highlight part
            F<l> ( ) = F<ĩ_H> ( )
            B<l> ( ) = B<ĩ_H> ( )
        end
    end
end
```

Figure 4D:
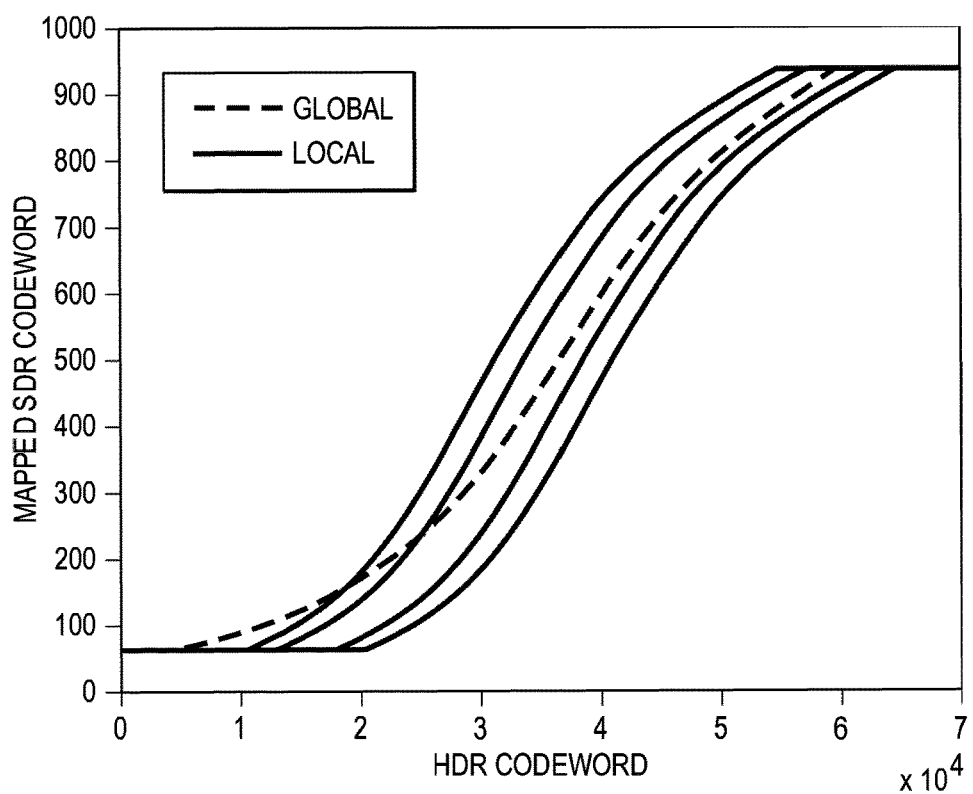
FIG. 4D depicts example plots of a set of local forward reshaping functions corresponding to the template forward reshaping function of FIG. 4B.
Figure 4E:
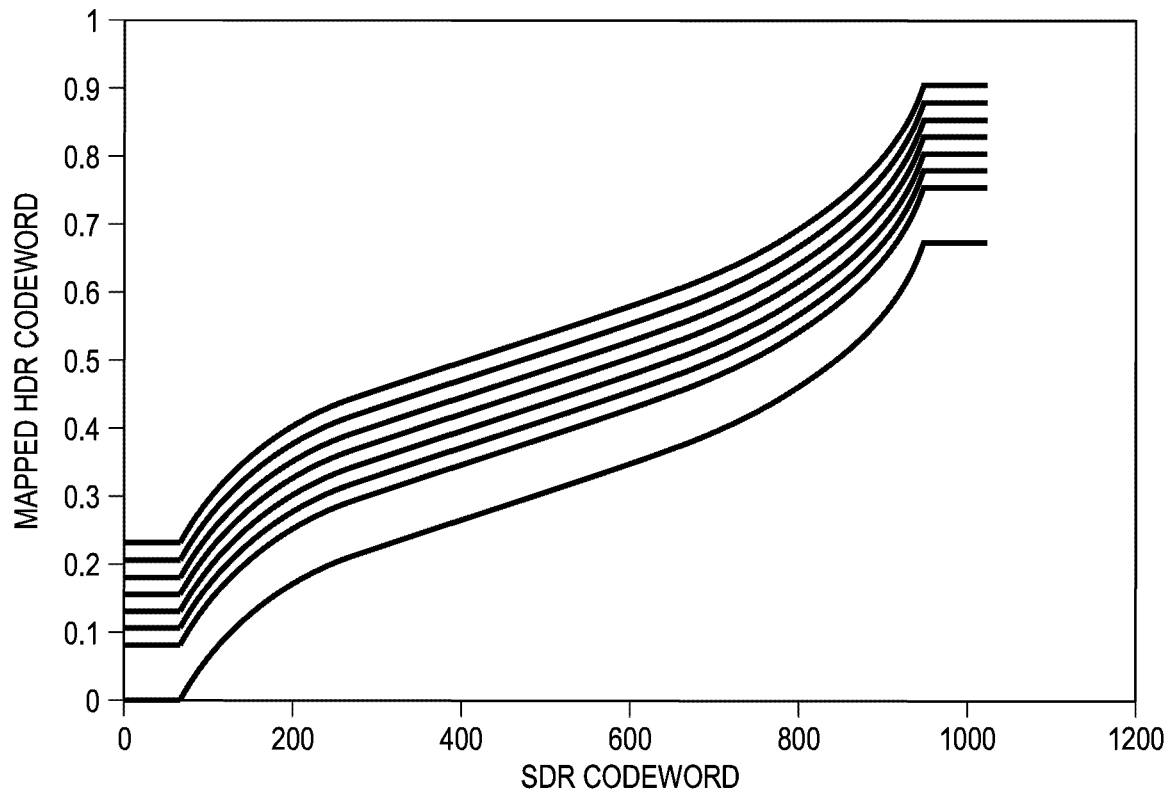
FIG. 4E depicts example plots of a set of local backward reshaping functions corresponding to the template backward reshaping function of FIG. 4C.

As an example, FIG. 4D depicts four of the L=1,024 local forward reshaping functions, for α=0.8, and the original global forward reshaping function. Smaller values of α cause sharper slopes and bigger shift. The sharper slope results in higher contrast ratio. Unless one adjusts both luma and chroma, a bigger shift may distort the colors of the image, e.g., the colors may look washed out. FIG. 4E depicts eight of the corresponding 1,024 local backward reshaping functions.

Variations and Notes

One of the potential issues in the proposed scale and shift-based derivation of local reshaping functions is the hard highlight/dark clipping in the local areas. As the slope becomes higher, the highlight and dark parts become saturated earlier. To avoid the early saturation issue, one can apply the following alternative solutions.

a) Apply Different Scale and Offset in Each Local Reshaping Function

In such an embodiment, for example, one may avoid scaling at the highlight and dark parts to avoid clipping. To make the transition smooth in the luminance domain, one may gradually change the scaling factor from 1 to the target value (say 0.8) from dark to mid-tones, stay a constant value at the mid-tones, and gradually increase to 1 when in the highlights part. With this approach, one can delay the early saturation issue. On the other hand, it also implies that the contrast ratio will be reduced in this approach.

b) Fusion of Local and Global Reshaping Functions

Under this embodiment, one may apply a weighted linear combination of local and global reshaping functions to move the saturation part away. The weighting factor can be a function of the luminance. When the local reshaping function is in dark or highlight part, the weights will be toward the global function; when the local function is in the mid-tone, the weights will be toward the local function.

Denote the weighting factors for global and local function as $\theta_{<l>}^G$ and $\theta_{<l>}^L$, where $$\theta_{<l>}^G + \theta_{<l>}^L = 1.$$

The final fused local reshaping function can be expressed as $$F_{<l>}(\ ) = \theta_{<l>}^L \cdot F_{<l>}(\ ) + \theta_{<l>}^G \cdot F^T(\ ),$$

$$B_{<l>}(\ ) = \theta_{<l>}^L \cdot B_{<l>}(\ ) + \theta_{<l>}^G \cdot B^T(\ ). \qquad (28)$$

For example, in an embodiment, for l=0 to L=1,023:

$$\theta_{<l>}^L \begin{cases} l * \frac{1}{300}; & \text{for } 0 \le l < 300 \\ 1; & \text{for } 300 \le l < 723 \\ \left(-\frac{1}{300}\right) * l + \frac{1023}{300}; & \text{for } 724 \le l \le 1023 \end{cases} \qquad (29)$$

$$\theta_{<l>}^G = 1 - \theta_{<l>}^L, \text{ for } l = 0 \text{ to } 1{,}023.$$

c) Using Local Reshaping as a Sharpening Operator

As appreciated by the inventors, when the global reshaping function is a simple one-to-one mapping, then the set of local forward reshaping function, as constructed using the algorithms discussed earlier, may be used as a sharpening operator. Thus, in an embodiment, one may use a set of local reshaping functions for SDR to SDR mapping with the ultimate goal to improve the perceived sharpness of the transmitted SDR images d) Backwards Compatibility Local reshaping does not require any additional metadata, but it may require a predefined knowledge of the local forward and backward reshaping functions, or at minimum, the characteristics of a global forward reshaping and/or a global backward reshaping function, for example, as defined by metadata 152, so that the local reshaped functions may be reconstructed locally. A legacy decoder that can't apply local backward reshaping can still apply global reshaping (e.g., as shown in FIG. 1B), even though the incoming SDR signal was coded with a local reshaper.

Figure 5:
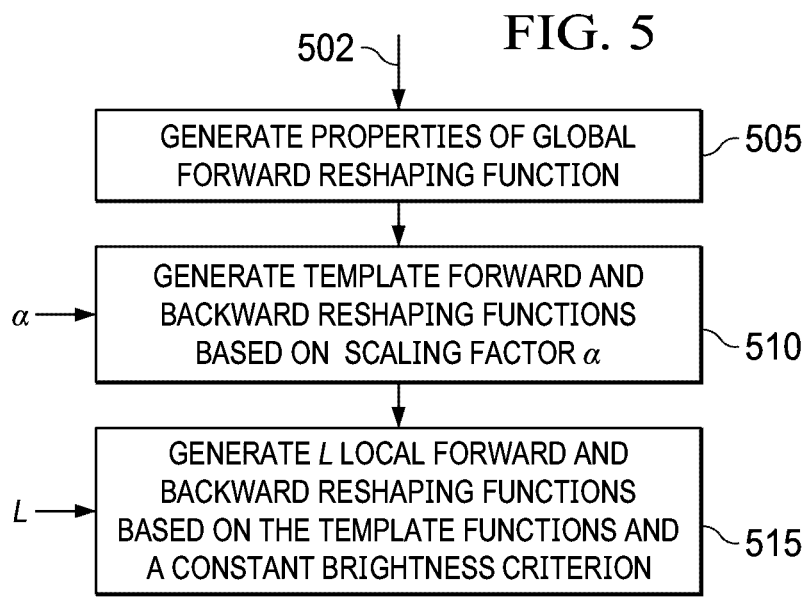
FIG. 5 depicts an example process to generate a family of local forward reshaping functions and a family of local backward reshaping functions based on a global forward reshaping function according to an embodiment of this invention.

FIG. 5 depicts an example summary of the process of generating a family of local reshaping functions based on a global reshaping function. As depicted in FIG. 5, given a global forward reshaping function (502), step 505 finds its properties (e.g., flat areas, range, and middle point). Given an x-axis scaling parameter a and the collected properties of the global forward reshaping function, in step 510: a) generate the template forward function, and b) after the generation of the forward function, generate the corresponding template backward reshaping function. Finally, given the desired number of functions (L), and an optimization constraint, say to maintain global brightness, step 515 generates the family of local forward and backward reshaping functions based on the template forward and backward reshaping functions.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to blind local reshaping, such as those described herein. The computer and/or IC may compute, any of a variety of parameters or values that relate to blind local reshaping as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for blind local reshaping as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to blind local reshaping for HDR images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for generating a reconstructed image using a set of two or more local backward reshaping functions and a set of two or more local forward reshaping functions, the method comprising:
receiving an input reshaped image (156) in the first dynamic range;
initializing (305) a first array of backward mapping indices, BMI, wherein each element of the first BMI array corresponds to a pixel of the input reshaped image and indicates an index of a local backward reshaping function in the set of two or more local backward reshaping functions, wherein a local backward reshaping function maps pixel values from the first dynamic range to pixel values in a second dynamic range; and
performing one or more iterations to generate an output reconstructed image in the second dynamic range, wherein an iteration comprises:
i) generating (310) a first reconstructed image in the second dynamic range by applying the set of two or more local backward reshaping functions to the input reshaped image according to the first BMI array;
ii) generating (315) a first array of forward mapping indices, FMI, using the first reconstructed image as input to an FMI-generation function, wherein each element of the first FMI array corresponds to a pixel in the first reconstructed image and indicates an index of a local forward reshaping function in the set of two or more local forward reshaping functions, wherein a local forward reshaping function maps pixel values from the second dynamic range to pixel values in the first dynamic range;
iii) generating a mapping-indices error according to a first error metric based on differences between elements of the first BMI array and the first FMI array corresponding to same pixels in both the input reshaped image and the first reconstructed image;
iv) generating (325) a second BMI array based on the first BMI array and the mapping-indices error;
v) generating (330) a second reconstructed image in the second dynamic range by applying the set of local backward reshaping functions to the input reshaped image according to the second BMI array;
vi) generating (335) a second FMI array using the second reconstructed image as input to the FMI-generation function;
vii) generating (340) an estimate reshaped image in the first dynamic range by applying the set of local forward reshaping functions to the second reconstructed image according to the second FMI array;
viii) generating a reshaped-images error according to a second error metric based on differences between the estimate reshaped image and the input reshaped image; and
ix) testing if a combination of the reshaped-images error and the mapping-indices error satisfies a convergence criterion:
if the converge criterion is satisfied, terminating the iteration and outputting the second reconstructed image as the output reconstructed image;

else:
replacing (360) elements of the BMI array based on elements of the second BMI array and the reshaped-images error; and
performing another iteration.

2. The method of claim 1, wherein all elements of the first BMI array are initialized to a constant value.

3. The method of claim 2, wherein for a set of Z local backward reshaping functions, all the elements of the first BMI array are initialized to L/2.

4. The method of claim 1, wherein for a pixel value in the first reconstructed image, the FMI-generation function assigns a value to a corresponding element of the FMI array according to luminance characteristics of one or more pixels surrounding the pixel value in the first reconstructed image.

5. The method of claim 1, wherein the FMI-generation function comprises computing $$m_{t,i}^{(k)}=G(\hat{v}_{t,i}^{(k)})=G_2(G_1(\hat{v}_{t,i}^{(k)})),$$

where, for the k-th iteration, t denotes a time-related index, $m_{t,i}^{(k)}$ denotes the i-th FMI array value, $\hat{v}_{t,i}^{(k)}$ denotes the i-th pixel value of the first reconstructed image, $G_1()$ comprises a function of luminance values surrounding $\hat{v}_{t,i}^{(k)}$, and $G_2()$ comprises a quantizer restricting the output of the $G_1()$ function between 0 and L−1, wherein L denotes the number of local forward reshaping functions.

6. The method of claim 5, wherein $G_1()$ comprises a low-pass filter or a Gaussian blurring filter.

7. The method of claim 1, wherein the first error metric is a mean absolute error or a mean squared error of the differences between the elements of the first BMI array and the first FMI array corresponding to same pixels in both the input reshaped image and the first reconstructed image.

8. The method of claim 1, wherein the second error metric is a mean absolute error or a mean squared error of differences between corresponding pixels of the estimate reshaped image and the input reshaped image.

9. The method of claim 1, wherein, at the k-th iteration, generating elements $n'_{t,i}^{(k)}$ of the second BMI array comprises computing $$n'_{t,i}^{(k)}=n_{t,i}^{(k)}+h(\alpha_1 \cdot \Delta mn_{t,i}^{(k)}),$$

wherein, $n_{t,i}^{(k)}$ denotes elements of the first BMI array, $\Delta mn_{t,i}^{(k)}$ denotes the mapping indices errors, $\alpha_1$ denotes a scaling factor, and h( ) denotes a rounding function.

10. The method of claim 1, wherein, at the k-th iteration, the convergence criterion comprises computing a weighted sum of the mapping-indices error and the reshaped-images error, and testing whether the weighted sum is lower than an iteration threshold.

11. The method of claim 1, further comprising generating the set of two or more local forward reshaping functions by:
accessing a global forward reshaping function;
generating property values for the global forward reshaping function, wherein the property values comprise one or more of: a non-flat region of the function in the second dynamic range, a mid-point of a non-flat region of the function in the second dynamic range, and flat regions for darks and highlights in the second dynamic range;
generating a template forward reshaping function based on the global forward reshaping function, the property values, and a non-flat region scaling factor;
generating a template backward reshaping function by computing an inverse function of the template forward reshaping function; and for a local forward reshaping function related to a target range of luminance values in the second dynamic range, generating the local forward reshaping function by shifting the template forward reshaping function by an x-axis shift value, wherein the x-axis shift value is determined so that, for the target range of luminance values, corresponding mean reshaped output values using the local forward reshaping function and the global forward reshaping function are approximately equal.

12. A non-transitory computer-readable storage medium having stored thereon computer-executable instructions for executing with one or more processors a method in accordance with claim 1.

13. An apparatus comprising a processor and configured to perform the method recited in claim 1.

* * * * *

UNITED STATES PATENT AND TRADEMARK OFFICE
CERTIFICATE OF CORRECTION

| | |
|---|---|
| PATENT NO. | : 12,368,964 B2 |
| APPLICATION NO. | : 17/916780 |
| DATED | : July 22, 2025 |
| INVENTOR(S) | : Su et al. |

It is certified that error appears in the above-identified patent and that said Letters Patent is hereby corrected as shown below:

In the Claims

Column 20, Line 8, In Claim 3, delete "Z" and insert --L-- therefor

Signed and Sealed this
Twenty-eighth Day of October, 2025

John A. Squires
*Director of the United States Patent and Trademark Office*